W. T. HOOFNAGLE.
APPARATUS FOR ELECTRICALLY TREATING AIR.
APPLICATION FILED APR. 23, 1915.

1,169,824.

Patented Feb. 1, 1916.
4 SHEETS—SHEET 3.

Inventor
Wm T. Hoofnagle
By Watson Boyden
Attorneys

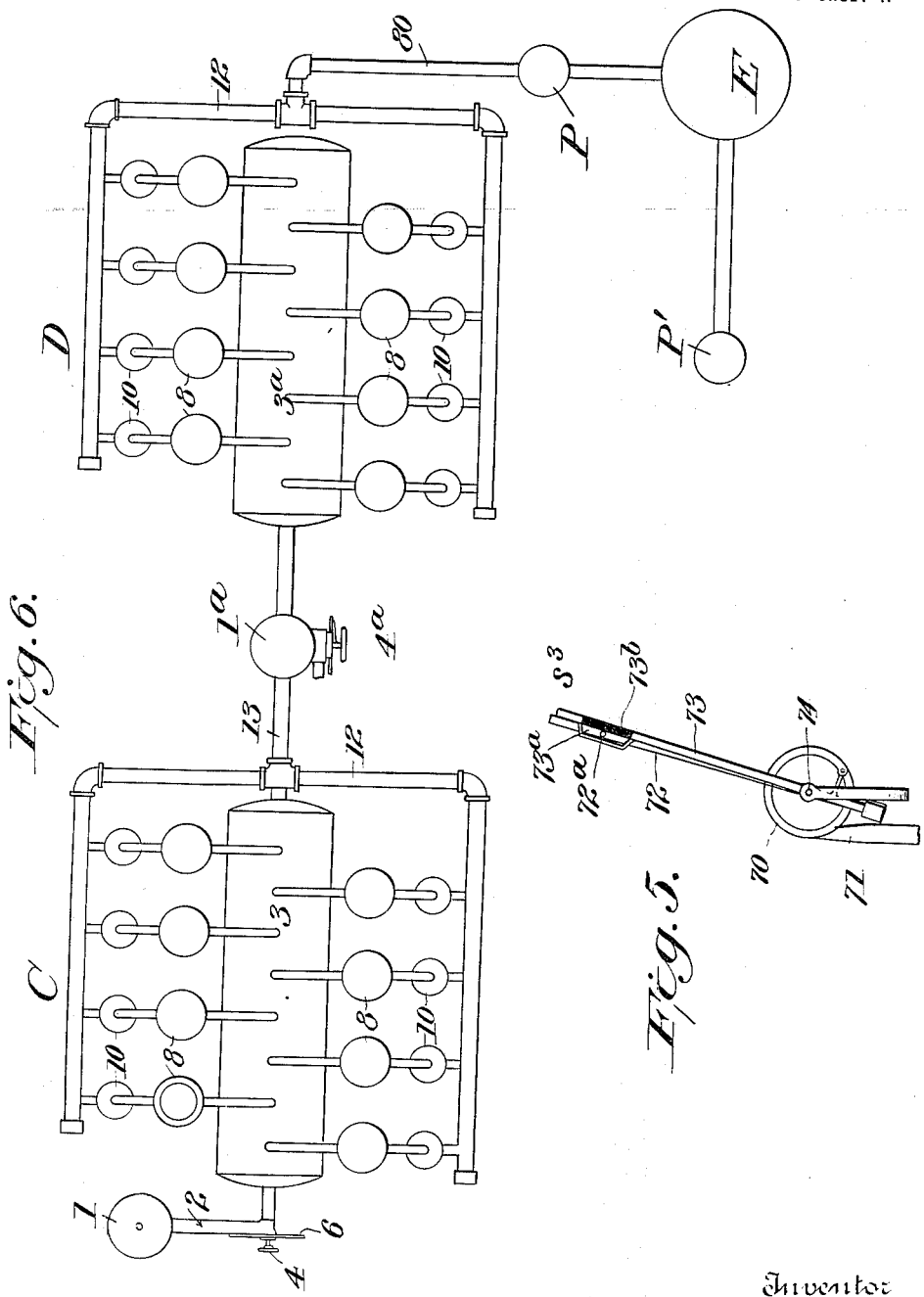

UNITED STATES PATENT OFFICE.

WILLIAM T. HOOFNAGLE, OF GLEN RIDGE, NEW JERSEY, ASSIGNOR TO ELECTRO-CHEMICAL PRODUCTS COMPANY, OF NEW YORK, N. Y., A CORPORATION OF NEW YORK.

APPARATUS FOR ELECTRICALLY TREATING AIR.

1,169,824.  Specification of Letters Patent.  Patented Feb. 1, 1916.

Application filed April 23, 1915. Serial No. 23,341.

*To all whom it may concern:*

Be it known that I, WILLIAM T. HOOFNAGLE, a citizen of the United States, residing at Glen Ridge, in the county of Essex and State of New Jersey, have invented certain new and useful Improvements in Apparatus for Electrically Treating Air, of which the following is a specification.

This invention relates to improvements in apparatus for electrically treating air, gases and vapors, and particularly for the recovery of nitrogen oxids from the air.

In certain patents previously granted to me, I have disclosed apparatus for treating air electrically while under less than atmospheric pressure, to cause a combination of the oxygen and nitrogen, and I have also shown means for treating the rarefied air in a quiescent state, in separate charges, in a closed chamber, the air being drawn through the apparatus by suitable exhaust mechanism. According to the present invention, also, the air is drawn through the apparatus by exhaust mechanism and treated, in a rarefied state, in a closed reaction chamber, in separate charges; but I have provided, additionally, means for first drying the air so that the operation of the apparatus will not be affected by varying atmospheric conditions, and then admitting the air, through a restricted passageway, into an expansion chamber or reservoir, in order to provide an ample supply of air at low pressure which can be admitted to the reaction chamber or chambers without the agitation which would occur if the air, at atmospheric pressure, were expanded directly into said latter chamber. Provision is made for automatically closing the reaction chamber at intervals, to confine charges of air therein while being treated electrically, and for automatically stopping the flow of current through the chamber at or near the critical point found to exist where a prolongation of the treatment would cause dissociation of the unstable oxids formed by the electrical treatment of the air up to that point.

The invention comprises also certain features of construction which will be clear from the following specification.

Figure 1:
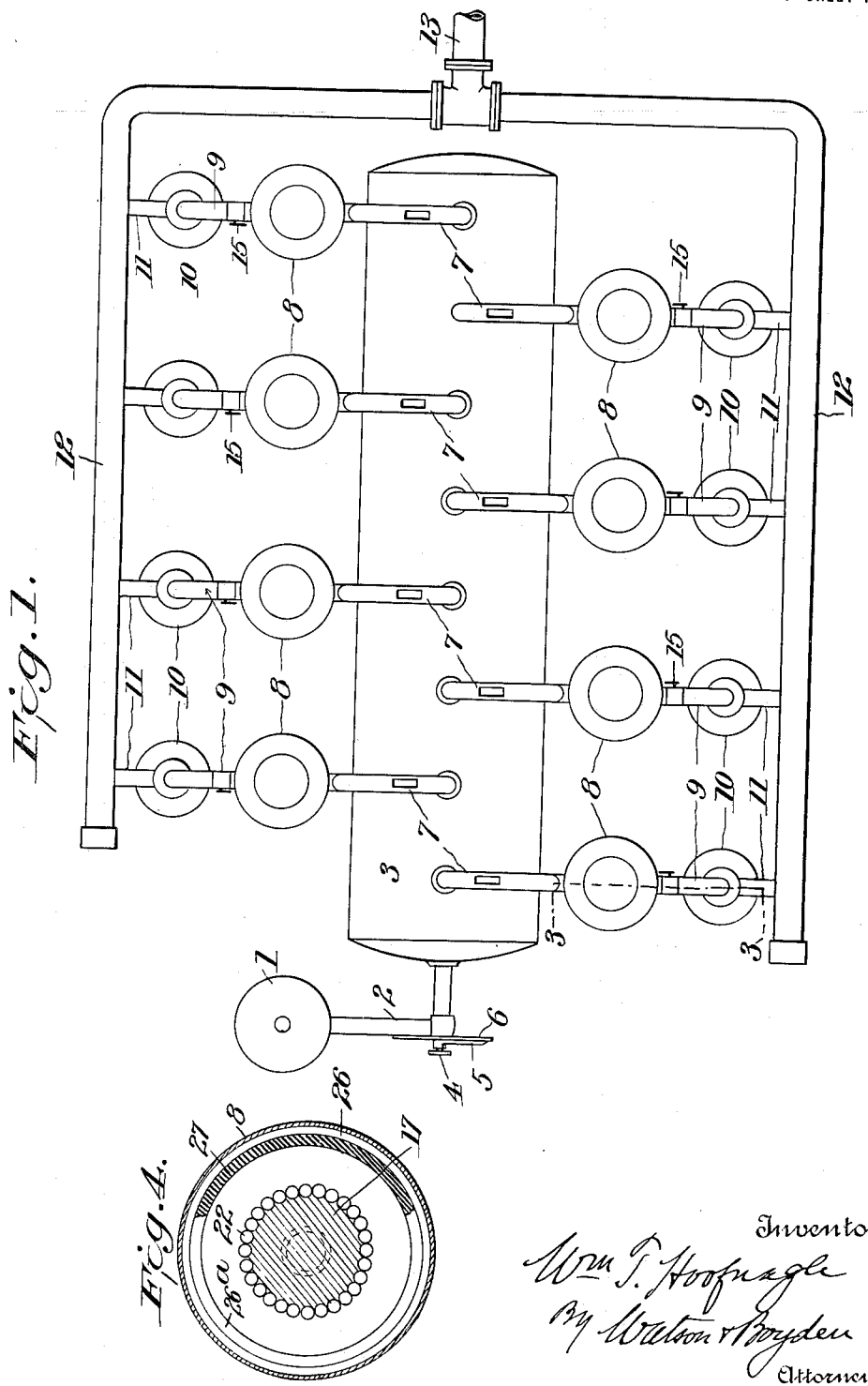
Figure 2:
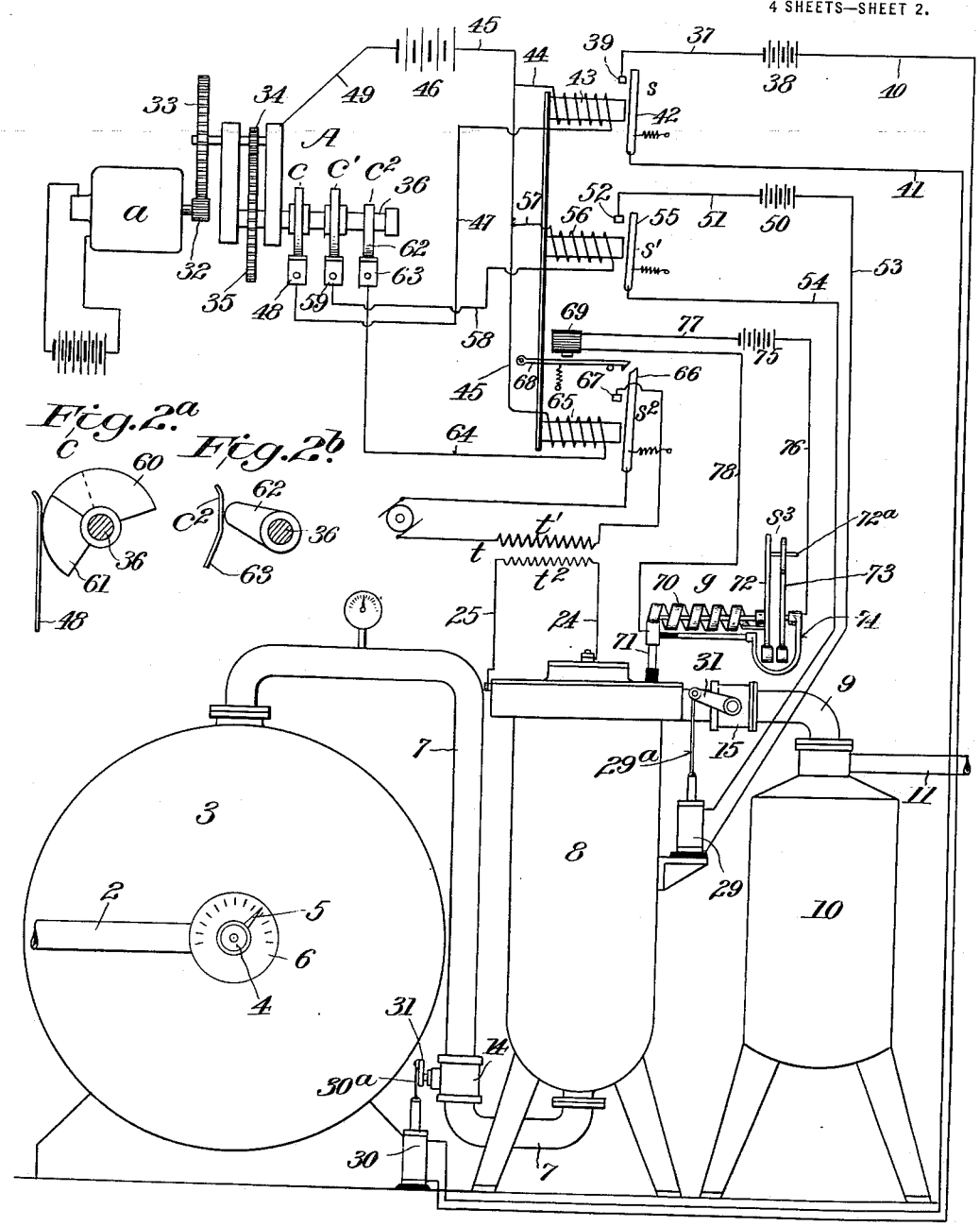
Figure 3:
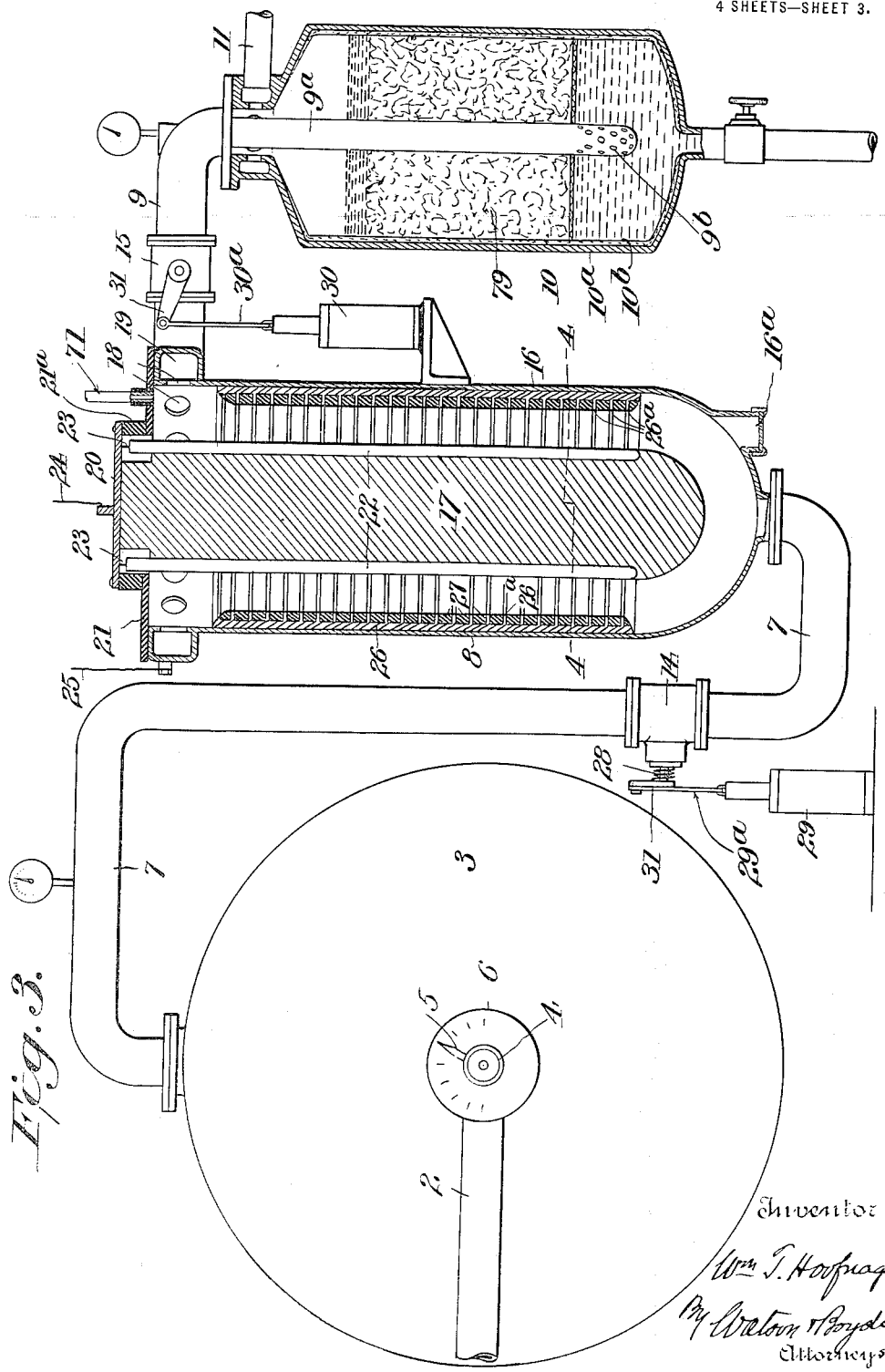

In the accompanying drawing, which illustrates my invention, Figure 1 is a top plan view of an air treating plant embodying my invention; Fig. 2 is an end elevation of part of the apparatus, showing one of the units, the electrical circuits being shown diagrammatically; Figs. 2$^a$ and 2$^b$ are detail views of the timed contact makers; Fig. 3 is a section on the line 3—3 of Fig. 1; Fig. 4 is a section through the reaction chamber on the line 4—4 of Fig. 3; Fig. 5 is a view showing details of the circuit controlling device for causing the interruption of the current through the reaction chamber; and, Fig. 6 is a top plan view of an air treating apparatus showing an extension of the system illustrated in Fig. 1.

Referring to Figs. 1 to 5, inclusive, of the drawing, 1 indicates a drier of any suitable kind through which the air to be treated enters the apparatus. This drier is connected by a suitable pipe 2 to an expansion tank 3, and in the pipe 2 is arranged a valve, the stem of which is shown at 4, for restricting the flow of air into said tank. Upon the stem of the valve is arranged a pointer 5, operating over a dial 6, which is graduated to indicate cubic feet of air per hour. The closed tank 3 is connected by pipes 7 to reaction chambers 8, and the latter are connected by pipes 9 to absorbers 10. Pipes 11 lead from the absorbers to trunk pipes 12, which are in turn connected by a pipe 13 to suitable exhaust mechanism. It will thus be seen that suction applied to the pipe 13 will cause air to be drawn through the drier 1 into the expansion chamber 3, thence through the reaction chambers and absorbers, and that by suitably adjusting the valve 4, the amount of air passing through the apparatus may be regulated and the desired rarefaction of the air produced.

In the pipes 7 and 11 are arranged valves 14 and 15, controlled by electrical devices hereinafter described, these valves closing automatically at certain times to retain charges of air in the reaction chambers while such charges are being electrically treated, and opening automatically, after the treatment has been applied for a proper period, as hereinafter explained. It has been found desirable, for the best results, to treat the air in a quiescent state, and for this reason the air is admitted in separate charges to the reaction chambers, treated therein, and then drawn out into and through the absorbers, and other charges of air are admitted to the reaction chambers for treatment, a certain amount of air, between charges, passing through the reaction chambers for scavenging purposes. If the air were admitted into the reaction chambers directly from the atmosphere, the difference in pressure would cause the air to rush into the reaction chambers with a great deal of agitation and surging, which it is desirable to prevent, and for this reason the large expansion chamber 3 is provided in order to have a supply of air which may be carried into the reaction chambers at a pressure much below the atmospheric pressure. In order to further avoid unnecessary agitation of the air, each reaction chamber is made in the form of a cup-like shell 16, having a central core 17, and the pipe 7 is connected to the bottom of the shell so that the air flowing from the expansion chamber to the absorber rises, as in a well, around the central core, and thence flows out through openings 18 in the top of the casing into an annular chamber 19, with which the pipe 9 is connected. These various devices and features of construction are provided in order that charges of air may be brought successively into the reaction chambers with the least amount of agitation and with the least amount of delay in bringing the air to a state of rest.

Each of the reaction chambers, as shown in the drawing, comprises the outer metal shell 16 and the central core 17, of insulating material, the latter suitably secured to a metal cap plate 20 which rests upon an annular collar or flange 21$^a$, projecting upwardly from, and integral with, a cover plate 21 of insulating material, which cover plate rests upon the top of the shell 16 and closes the same. The core 17, which is circular in cross-section, is centered in the shell 16 and a series of glass tubes 22 (Figs. 3 and 4), extending lengthwise of the core and arranged closely together in a circular group around the core, are each closed at the bottom and filled with a suitable conducting fluid, such as mercury or acidulated water, the liquid forming the inner electrode of the reaction chamber. These tubes are of comparatively small diameter and the circular group forms an inner tubular wall concentric with the outer electrode. Conducting wires 23 lead from the cap plate down into the several tubes and thus connect the liquid contents of the tubes electrically with the cap plate. This cap plate is connected by a conductor 24 to one end of the secondary coil $t^2$ of a transformer $t$, and the other end of this wire is connected by conductor 25 to a suitable binding post on the outer metallic casing of the reaction chamber. Fitting closely within the shell of the reaction chamber is a cylindrical metal electrode 26, extending the full height of the liquid in the tubes 22, and this electrode is preferably provided with thin annular ribs 26$^a$, spaced apart from one another and of uniform depth. Preferably, rings 27 of insulating material are arranged between the ribs. When an electric discharge takes place through the space between the electrodes, the ribs form annular discharging or concentrating points, and as the inner electrode is within the dielectric tubes, this arrangement of electrodes forms a current rectifying medium for the high tension alternating current generated in the secondary of the transformer $t$, the current discharged through the air becoming partly uni-directional. A glass covered sight opening 16$^a$ is provided in the bottom of the casing 16, in order that the electric field within the chamber may be observed, the appearance of this field serving as a means for indicating when the current strength is right and when it needs adjustment. A condenser effect results from the interposition of the dielectric tubes 22 between the opposing electrodes, and because of the dielectric, the current strength passing through the air space is small and heating is prevented; the voltage, however, is high and the necessary wattage is obtained for causing the combination of the oxygen and nitrogen. The tubes inclosing the inner liquid electrode are preferably sealed at the top with oil or other non-conducting fluid, to prevent evaporation of the conducting fluids, and also to prevent any arcing which might otherwise occur over the tops of the tubes. These tubes also might be made of metal, coated with a suitable enamel or other dielectric substance. The electrode 26, or its surface, should be of non-oxidizable metal, and all metal parts with which the treated air comes in contact, such as the casing of the reaction chamber and the pipes leading therefrom, should either be made of non-oxidizable material or lined with such.

It will be understood that the exhaust mechanism for drawing air into and through the apparatus is kept in constant operation. Provision is made, however, for closing each reaction chamber at intervals by means of the valves 14 and 15, in order to retain air in the chamber long enough to have it treated electrically, in separate charges. For this purpose, the valves referred to are held normally open by suitable means, such as springs 28, one of which is shown in Fig. 3, and they are closed temporarily, at intervals, by solenoids 29 and 30, the cores of which are mechanically connected by links 29$^a$ and 30$^a$, of insulating material, to levers 31, attached to the valve stems. These solenoids are timed in their operation by a constantly driven contact making mechanism A, which, as shown, is operated by a small electric motor $a$. This motor, through reduction gears 32, 33, 34, and 35, operates a shaft 36, upon which are arranged several contact making arms or segments $c$, $c'$, and $c^2$. The first two of these contact makers $c$, $c'$ are alike and they control electromagnetic switches $s$ and $s'$ for closing the electric circuits through the coils of solenoids 30 and 29, respectively. As shown, a conductor 37 leads from a suitable current source 38 to a stationary contact 39 of the switch $s$, and conductors 40 and 41 lead from the opposite pole of the current source, through the coils of solenoid 30 and thence to the switch arm 42 of the switch $s$. Hence, when the switch $s$ is closed, the solenoid 30 will be energized and will instantly close the valve 14, and when this switch is opened, the spring 28 will open the valve 14. The switch $s$ is normally open and is closed at intervals by means of a magnet 43, one terminal of which is connected by conductors 44 and 45 to one pole of a suitable current source 46, while the other terminal of the magnet coil is connected by conductor 47 to a stationary contact member 48, adapted to be engaged by the contact making device $c$ on the shaft 36. This shaft and the contact makers thereon are connected to the current source 46 by a conductor 49. When the contact maker $c$ engages the contact 48 therefor, the magnet 43 will be energized and this will cause the switch $s$ to be closed and the solenoid 30 will operate to close the valve 14, and when the contact maker $c$ passes out of engagement with the stationary contact 48, the magnet 43 will be deenergized, the switch $s$ will open, breaking the circuit through the solenoid 30, and the valve 14 will move to open position. The solenoid 29, controlling the valve 15, is energized and deënergized in a similar manner through the contact making device $c'$. As shown, a conductor 51 leads from a suitable current source 50 to a stationary contact 52 on the switch $s'$, and from the other pole of said source, a conductor 53 leads to the solenoid 29, and a conductor 54 leads from said solenoid to the switch arm 55 of the switch $s'$. This switch is normally open, and a magnet 56 is provided for closing the switch. One terminal of the coil of this magnet is connected by conductors 57 and 45 to the current source 46, and the other coil terminal is connected by conductor 58 to a stationary contact 59, adapted to be engaged at intervals by the contact making device $c'$, which latter is electrically connected through the shaft 36 and conductor 49 to the current source 46.

The contact making devices $c$ and $c'$, as stated, are alike, and they are arranged to make substantially simultaneous engagement with the adjacent stationary contacts 48 and 59, respectively, in order to cause the valves 14 and 15 to close simultaneously; but the contact making devices are formed so that the duration of contact may be shortened or lengthened as may seem necessary or desirable, according to the atmospheric conditions, or the working requirements of the apparatus. Thus, as shown in Fig. 2$^a$, each contact making device comprises two segments 60 and 61, fitted to the shaft 36, close together, so that they may both engage the adjacent stationary spring contact, and it will be evident that by adjusting one of these segments relatively to the other, circumferentially of the shaft, the combined peripheral contact surfaces may be lengthened or shortened, and the duration of contact will vary accordingly. These segments may be adjustably secured upon the shaft by any suitable means, such as set screws.

As soon as the valves 14 and 15 are closed by the mechanism just described, a high tension current is passed through the confined charge of air in the reaction chamber; but, while the time of commencement of this application of the current is determined by the timing contact mechanism A, the cutting off of the current in the reaction chamber is determined by mechanism controlled by a variation in the pressure in said chamber, which change in pressure, as hereinafter explained, is an indication that the treatment has extended to the critical point where the greatest chemical combination between the oxygen and nitrogen has taken place, and where a further prolongation of the treatment would result in the dissociation of the higher and unstable oxids. For the purpose of applying the current to the reaction chamber, after a charge of air has been confined therein by the closure of the valves 14 and 15, the contact maker $c^2$ is provided upon the shaft 36. This contact maker, as shown in Fig. 2$^b$, comprises simply an arm 62 which engages a stationary contact 63, after the contact makers $c$ and $c'$ have closed their respective circuits. This contact arm 62 has only a relatively short engagement with the stationary contact 63, engaging said contact after the contact makers $c$ and $c'$ have closed, and moving out of engagement with the contact 63, before said contact makers $c$ and $c'$ have opened their circuits. The function of the contact maker $c^2$ is to close the relay switch $s^2$ after the valves 14 and 15 have closed. The contact arm 62 is connected to one side of the current source 46, through conductor 49 and shaft 36, and the coöperating stationary contact member 63 is connected by wire 64 to one terminal of the coil of magnet 65, the other terminal of said coil being connected by conductor 45 to the opposite pole of the current source 46. Thus, when the contact members 62 and 63 engage, the magnet 65 will be energized and the switch arm 66 of switch $s^2$ will be closed against the stationary contact 67 of said switch. A spring catch 68 holds the switch arm 66 in its closed position, after the contact members 62 and 63 have become disengaged. This switch $s^2$, when closed, completes the circuit through the primary winding $t'$ of the transformer $t$, and hence causes the secondary high tension current to flow through the reaction chamber as long as the switch $s^2$ is closed.

The electrical treatment of the air confined in the reaction chamber results in the formation of nitrogen oxids and ozone, the ozone combining with the oxids forming the higher oxid $N_2O_5$. This chemical union results in a consequent decrease in pressure within said chamber, up to a certain critical point; but, as before stated, the continued application of the current, after this point has been reached, is detrimental, causing a rapid breaking down of the higher oxids into the lower and more stable oxid NO, thereby reducing the amount of combined nitrogen and oxygen in the air. This breaking down of the higher oxids results in an increase in pressure in the reaction chamber. In order to cut off the application of the current applied to the reaction chamber as nearly as possible at the point where the higher oxids commence to break down, I provide a magnet 69 for moving the latch 68 to release the switch arm 66, and the switch $s^3$, controlled by the pressure gage, which latter is connected to the reaction chamber and operates the switch $s^3$ so as to energize the magnet 69 and release the switch arm 66 whenever the pressure in the reaction chamber tends to increase by reason of the breaking down of the higher oxids. At the time when the current is first applied to a charge of air confined within the chamber, a slow rise in pressure will result from heating of the air; but the switch $s^2$ will not be released on this rise in pressure because the arm 62 will be in engagement with the contact 63 during the first part of the treatment, and the magnet 65 will be energized and will hold the switch $s^2$ closed until said arm 62 leaves the contact 63. After this contact is broken, the pressure controlled switch $s^3$ can operate to release the switch $s^2$, and this will occur, as above explained, when the pressure, after falling, tends to rise again.

The pressure gage for controlling the switch $s^3$ is shown as a coiled flat tube 70, this style of gage being well known, and it is connected to the reaction chamber through a supporting tube of insulating material 71. Connected to this tube is an indicator arm 72, which swings about the axis of the tube under varying pressures in the reaction chamber, the indicator in this instance serving as a contact device for opening and closing an electrical circuit through the releasing magnet 69. The arm 72 carries a pin $72^a$, which extends through a slot $73^a$ in a similar balanced arm 73, the latter pivoted upon a supporting arm 74 and arranged to swing about the same axis as the arm 72. The slot $73^a$ has one wall $73^b$, of insulating material, and the opposite wall of metal, and the distance between these walls is very slightly greater than the diameter of the contact pin $72^a$ on the arm 72. Hence, it will be evident that when the pressure in the reaction chamber falls and the coil 70, in consequence, tends to tighten, the pin $72^a$ will bear against the insulating wall $73^b$ of the member 73, and there will be no electrical connection between the two members; but any increase in pressure in the reaction chamber will cause the gage to move the arm 72 in the opposite direction and the pin $72^a$ thereon will engage the metal wall of the slot in the member 73, and this will close the circuit through the releasing magnet 69, causing the switch $s^2$ to be released and interrupting the current flow through the reaction chamber. The circuit of the magnet 69 extends from a suitable source 75 through conductor 76 to the balanced contact arm 73, and from the other pole of the current source, through conductor 77, coil of magnet 69 and conductor 78 to the metal coil of the gage, and thence to the arm 72 and pin $72^a$.

Any suitable form of absorber may be employed for absorbing the combined oxygen and nitrogen after it leaves the reaction chamber. In Fig. 3, the absorber 10 comprises a suitable vessel $10^a$ having an acid-proof lining $10^b$. The pipe 9 leads from the reaction chamber to the pipe $9^a$, extending downwardly into the lower part of the absorber, this pipe having perforations $9^b$, to permit the gases to flow outward into the vessel $10^a$. This vessel contains a suitable absorbing liquid, such as dilute nitric acid, and also a filling of stone or other lumpy substance 79, which forms a baffle so that the gas bubbles flowing upwardly through the liquid will be impeded and more or less broken up and more rapidly absorbed by the liquid. The gases not absorbed will pass from the pipe 11, either directly to the exhaust mechanism, or through other absorbers arranged between the first absorber and the exhaust mechanism.

It will be understood from the foregoing that the exhaust mechanism is continually in operation and the air is admitted from the drier to the rest of the apparatus through the regulating valve 4, which restricts the flow of air and thereby, the air within the apparatus and undergoing treatment is at considerably less than atmospheric pressure, a condition which has been found most favorable for effecting a combination of the oxygen and nitrogen when the electric current is passed through the air. The expansion chamber, as before explained, is provided in order that air may be delivered at a low pressure into the reaction chambers, in order to avoid, as much as possible, the agitation of the air in said chambers, as would occur if the air were admitted directly from the atmosphere. The reaction chamber is closed at intervals by the electrically controlled valves; the current is then applied to the air in the reaction chamber as long as the pressure therein continues to fall, due to the decreasing volume resulting from the combination of the oxygen and nitrogen, and, at the critical moment, when the unstable oxids tend to break up and cause an increase in volume and pressure within the chamber, the application of the current to the reaction chamber is cut off by the electric mechanism controlled by the pressure gage. The electrically controlled valves then open and the treated air and gases are drawn into the absorber, or a series of absorbers, where the oxids are absorbed and the gases not absorbed are carried out through the exhaust mechanism.

Fig. 6 shows in outline two air treating plants like that shown in Fig. 1, connected in series, with a drier between them. In this view the plant C is the same as that already described in Fig. 1, and it is connected to the plant D through a drier $1^a$, and this drier is provided with a valve $4^a$, for admitting restricted quantities of air, through said drier into the plant D. An exhaust pump P is connected by a pipe 80 to the trunk pipe 12 of plant D, and this pump maintains the air in a rarefied state throughout both plants and compresses the unabsorbed gases and any moisture mingled therewith arising from the absorbing liquid into a barometric condenser E, where the moisture is extracted, and a pump P' then compresses the gases up to atmospheric pressure and expels them into the atmosphere.

The driers, it should be explained, are for the purpose of having the air which enters the apparatus as uniform as possible with respect to the amount of moisture which it contains, regardless of weather conditions, as it is found that the action of the apparatus varies under different atmospheric conditions, and I therefore provide the driers in order to dry the air before it enters the reaction chambers. In Fig. 6, it will be understood, that the unabsorbed gases from the plant C will pass through the drier $1^a$ into the expansion tank $3^a$ of the plant D. An additional quantity of air may be admitted through the valve $4^a$ and drier $1^a$ into the expansion tank $3^a$, and the air will pass from this expansion tank $3^a$, through the reaction chambers and absorbers of the plant D, the unabsorbed products passing out through the exhaust mechanism. It will be understood that any desired number of plants may be connected in series, as shown, to the same exhaust mechanism and that, between the plants, driers and air admission valves may be provided for the purpose of supplying the proper amount of air to the system.

The apparatus is not limited in its use to the treatment of air only, but may be used for treating any gases or vapors which change or combine under the influence of electricity.

The pressure controlled mechanism for stopping the flow of current might be variously arranged without departing from the spirit of my invention. For instance, the contact finger carried by the pressure gage might be arranged to close the circuit of the releasing magnet on a falling pressure instead of a rising pressure in the reaction chamber, but, as the fall in pressure is not always the same with successive charges of air, the action is more reliable if the contact is made, as nearly as possible, at the moment when the rise in pressure commences.

The apparatus may be modified so that the reaction chambers will be connected to the inlet side of a pump, or pumps, and the absorption chambers to the compression side, and thus the liquid in the absorbers, as well as the gases passing through the liquid will be at substantially atmospheric pressure, which facilitates absorption because of less agitation of the liquid and more intermediate contact between the liquid and the gases than when the pressure is lower and the gases expand in passing through the liquid.

What I claim is:

1. An apparatus for electrically treating air, gases, or vapors comprising a reaction chamber, means for closing the same to confine a charge of the fluid to be treated therein, means for passing an electric current through the fluid in the chamber while closed, and means controlled by chemical change in the fluid within the chamber for cutting off the current.

2. An apparatus for electrically treating air, gases, or vapors comprising a reaction chamber, means for closing the same to confine a charge of the fluid to be treated therein, means for passing an electric current through the fluid in the chamber while closed, and means responsive to an increase in pressure in the chamber due to chemical change in the fluid therein for cutting off the current.

3. An apparatus for electrically treating air, gases or vapors comprising a reaction chamber, means for opening and closing the same at intervals to admit and confine successive charges of the fluid to be treated therein, means for passing an electric current through each confined charge including a switch, and means controlled by variation in pressure in the reaction chamber due to chemical change in the fluid therein for releasing said switch to stop the flow of current through said chamber.

4. An apparatus for electrically treating air, gases or vapors comprising a reaction chamber, means for opening and closing the same at intervals to admit and confine successive charges of the fluid to be treated therein, means for passing an electric current through each confined charge including a relay switch, a pressure gage connected to the reaction chamber, and a switch operated by said gage adapted to control the releasing circuit of said relay switch.

5. An apparatus for electrically treating air, gases or vapor comprising a reaction chamber, means for closing the same to confine a charge of the fluid to be treated therein, means for passing an electric current through the fluid in the chamber while closed, and means controlled by change in pressure in the chamber for cutting off the current comprising a pressure gage connected to the chamber, a contact member movable by the gage, an adjacent contact member movable back and forth with said first mentioned member, said members having contact surfaces adapted to engage in one direction of movement but not in the other, and electrical means controlled by said members for interrupting the current flow through said chamber.

6. An apparatus for electrically treating air, gases or vapors comprising a reaction chamber, means for drawing the fluid to be treated through the chamber, means for intermittently closing and opening the chamber at timed intervals to confine and release charges of the fluid, means for passing an electric current through each confined charge, and means controlled by variation in pressure in the chamber for interrupting the flow of current therethrough.

7. In an apparatus for electrically treating air, gases or vapors, a reaction chamber, means for producing a current of the fluid to be treated therethrough, valves for opening and closing the chamber, electromagnetic devices for operating the valves, time-controlled contact devices for closing and opening the circuits of said devices, timed means for closing an electric current through said chamber each time the valves are closed, and means controlled by variation in pressure in the chamber for interrupting the current flow therethrough.

8. In an apparatus for electrically treating air, gases or vapors, an expansion tank and a reaction chamber, means for drawing the fluid to be treated through said tank and thence through said chamber, and means for restricting the flow of said fluid into the expansion tank.

9. In an apparatus for electrically treating air, gases or vapors, an expansion tank and a reaction chamber, means for drawing the fluid to be treated through said tank and chamber successively, means for restricting the flow of said fluid into the expansion tank, means for intermittently confining charges of the fluid in the reaction chamber, and means for passing an electric current through the confined charges.

10. In an apparatus for electrically treating air, a drier for the air, an expansion tank and a reaction chamber, means for drawing air through said drier, thence through said tank and thence through said chamber, and means for restricting the flow of air into the expansion tank to cause rarefaction of the air therein.

11. In an apparatus for electrically treating air, an expansion tank, a plurality of reaction chambers, each connected to said tank, an exhaust mechanism connected to the several reaction chambers, and means for restricting the flow of air into said expansion tank.

12. In an apparatus for electrically treating air, an expansion tank, a plurality of reaction chambers, each connected to said tank, absorbers connected to said chambers, an exhaust mechanism connected to the several absorbers, and means for restricting the flow of air into said expansion tank.

13. In an apparatus for electrically treating air, two expansion tanks, a reaction chamber and an absorber connected in series with each tank, a drier connected between one tank and the absorber associated with the other tank, exhaust mechanism, and pipe connections for drawing air successively through a tank, a reaction chamber and an absorber, thence through the other tank, a reaction chamber and an absorber, and means for restricting the flow of air into the first tank in the series.

14. In an apparatus for electrically treating air, two expansion tanks, a reaction chamber and an absorber connected in series with each tank, exhaust mechanism, and pipe connections for drawing air successively through a tank, a reaction chamber and an absorber, thence through the other tank, reaction chamber and absorber, and means for admitting a restricted flow of air into each tank.

15. In an apparatus for electrically treating air, gases or vapors, a reaction chamber comprising a casing, an outer tubular electrode within the casing, and an inner electrode comprising a series of dielectric tubes of small diameter closely arranged and forming an inner tubular wall concentric with the outer electrode, said dielectric tubes containing a conducting medium.

16. In an apparatus for electrically treating air, gases or vapors, a reaction chamber comprising a cylindrical casing, a core of insulating material centered in the casing, and a circular series of dielectric tubes surrounding the core and containing a conducting medium.

17. In an apparatus for electrically treating air, gases or vapors, a reaction chamber comprising a casing, a tubular electrode within the casing, a core of insulating material centered in the tubular electrode, and a circular series of dielectric tubes surrounding the core and containing a conducting medium.

18. In an apparatus for electrically treating air, gases or vapors, a reaction chamber comprising a casing, a tubular electrode within the casing, said electrode having a plurality of thin, annular, inwardly-projecting ribs and insulating rings between said ribs, and an electrode arranged centrally within said tubular electrode.

In testimony whereof I have affixed my signature.

WILLIAM T. HOOFNAGLE.